United States Patent [19]

Duenke

[11] 4,313,628
[45] Feb. 2, 1982

[54] COUPLING FOR HOSES AND SIMILAR CONDUITS

[76] Inventor: Milton J. Duenke, 17 Jennycliffe La., Chesterfield, Mo. 63017

[21] Appl. No.: 147,565

[22] Filed: May 8, 1980

[51] Int. Cl.³ ............................................. F16L 33/24
[52] U.S. Cl. .................................. 285/115; 285/246; 285/259; 285/387; 285/DIG. 22
[58] Field of Search ............... 285/174, 246, 247, 115, 285/255, 259, 250, 387, 388, DIG. 22, 258

[56] References Cited

U.S. PATENT DOCUMENTS

| | | | |
|---|---|---|---|
| 149,441 | 4/1874 | Caswell | 285/174 |
| 458,038 | 8/1891 | Rice | 285/246 |
| 931,173 | 8/1909 | Zimmerman | 285/246 |
| 951,516 | 3/1910 | Stephens | 285/174 |
| 964,579 | 7/1910 | Stephens | 285/174 |
| 969,216 | 9/1910 | Stephens | 285/247 |
| 1,509,484 | 9/1924 | Powell | 285/246 |
| 2,814,862 | 12/1957 | Heckethorn | 285/174 X |
| 2,902,299 | 9/1959 | Turner | 285/258 |
| 2,907,591 | 10/1959 | Gulick | 285/174 |
| 3,352,577 | 11/1967 | Medney | 285/246 |
| 3,381,982 | 5/1968 | Elek | 285/247 X |
| 3,549,177 | 12/1970 | Sotolongo | 285/247 X |

FOREIGN PATENT DOCUMENTS

| | | | |
|---|---|---|---|
| 319732 | 7/1902 | France | 285/246 |
| 1084003 | 6/1954 | France | 285/174 |
| 36079 | 3/1906 | Switzerland | 285/247 |
| 14546 | of 1899 | United Kingdom | 285/247 |
| 305119 | 4/1929 | United Kingdom | 285/246 |

*Primary Examiner*—Thomas F. Callaghan
*Attorney, Agent, or Firm*—Gravely, Lieder & Woodruff

[57] ABSTRACT

A connection at which two hoses or similar conduits are coupled includes a male coupling on one of the hoses and a female coupling on the other hose. The male coupling consists of a body that receives the hose and a tapered bushing which threads into the hose and spreads it outwardly into the body. The body has a threaded end section. The female coupling consists of a threaded ring having an inwardly opening groove, a ferrule that receives the hose and has at its one end a flange which fits into the groove of the ring, and a tapered bushing that threads into the hose and expands it against the ferrule. When the hose and bushing are out of the ferrule, the flange of the ferrule will fit into the ring, but when the hose is expanded outwardly by the bushing, the flange of the ferrule is captured in the groove of the ring. The ring threads over the threaded end section of the male coupling and forces the ends of the threaded section and the ferrule together. Since both the body of the male coupling and the ferrule of the female coupling are formed from a somewhat flexible material, an extremely good seal is created at the area of abutment. The end of the ring also abuts against a shoulder on the body of the male coupling, while the ring along the side wall of its groove bears tightly against the flange on the ferrule of the female coupling, forming very secure seals at these locations also. This redundancy of seals renders the connection virtually leakproof.

11 Claims, 4 Drawing Figures

COUPLING FOR HOSES AND SIMILAR CONDUITS

BACKGROUND OF THE INVENTION

This invention relates in general to couplings or connecting devices and more particularly to couplings and connections for joining hoses and pipes.

The typical garden hose is sold with male and female couplings which are secured permanently to the ends of the hose. These couplings are often rolled or otherwise formed from relatively thin brass, and as a consequence they often bend out of shape. This usually produces a leak at the coupling, for it is impossible to acquire a good seal at a distorted surface, even when a rubber washer is present. Moreover, it is not uncommon for a coupling to become detached from its hose, and most permanent-type couplings cannot be reattached to their hoses. Also, a hose usually experiences its sharpest bends where it emerges from its couplings, particularly where a coupling is attached to a fixed object such as a wall hydrant. It is not uncommon for a hose to develop leaks in these sharply bent areas.

Because the actual hose often outlasts its couplings, replacement couplings are currently available, but these replacement couplings are not altogether satisfactory. Moreover, one common replacement coupling is secured in place by a somewhat tapered bushing that threads into the interior of the hose end and expands that end outwardly into a tight frictional fit with the remainder of the coupling. These bushings, being considerably smaller on their insides than the hose itself, significantly restrict the flow of water through the hose. Furthermore, replacement couplings are even less secure than the original couplings and stand an even greater chance of coming loose. Likewise, they are usually made of thin brass and tend to leak, even though they are fitted with washers.

Also other tubular members such as plastic and metal water pipes and electrical conduits are difficult to connect securely and in a fluid-tight manner or in a manner that does not interfere with that which is passed through the tubular member.

SUMMARY OF THE INVENTION

One of the primary objects of the present invention is to provide simple couplings for hoses, pipes, and the like, which are easy to install and connect together to form a very secure and fluid-tight connection. Another object is to provide couplings which do not impede the flow of fluid through a hose or other conduit. A further object is to provide couplings which reduce the tendency of the hose to bend sharply or kink where the hose emerges from the couplings. An additional object is to provide a coupling having a component which is formed from a somewhat flexible or resilient material and when tightened down against a corresponding component of mating coupling forms a fluid-tight seal between the two couplings. Still another object is to provide a coupling which may be installed as a replacement, yet may be fastened securely to a hose. Yet another object is to provide a coupling which will connect with conventional couplings. Another object is to provide couplings which are suitable for connecting a wide variety of conduits. These and other objects and advantages will become apparent hereinafter.

The present invention is embodied in a connection including a first flexible body fitted over a first conduit and a bushing for spreading the first conduit into the first body. In addition, a second flexible body fits over the second conduit and a second bushing spreads that conduit into the second body. Means are provided on the second body for engaging the first body and drawing the ends of the two bodies together into fluid-tight contact. The invention also resides in a male coupling having a flexible body provided with a threaded end portion and a tapered bushing that threads into a hose and spreads it outwardly into the body. The invention further resides in a female coupling having a threaded ring provided with an inwardly opening groove, a flexible ferrule having a flange that will, unless rigidified, fit through the ring and project into its groove, and a tapered bushing that threads into the hose to expand it outwardly against the ferrule and thereby rigidify the flange on the ferrule so that it is captured in the groove of the ring. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
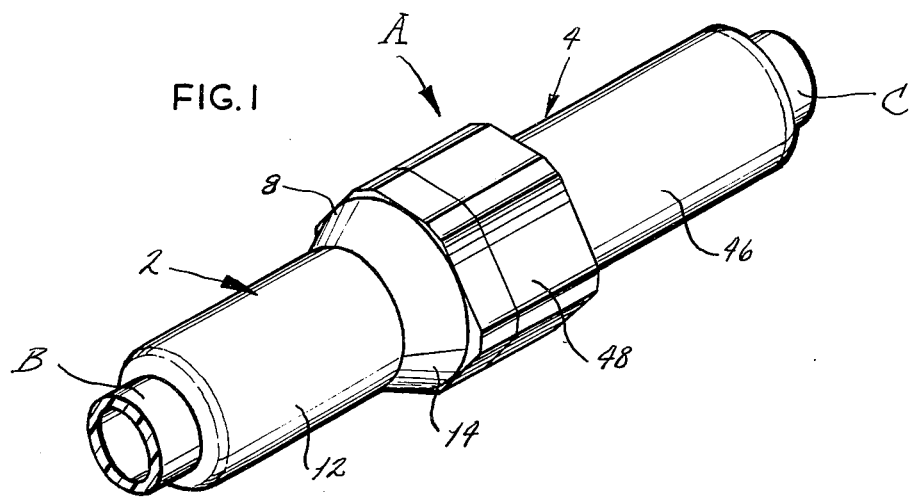
FIG. 1 is a perspective view of a hose connection constructed in accordance with and embodying the present invention.

Referring now to the drawings (FIG. 1), A designates a connection which serves to join the ends of two hoses B and C together in a secure and fluid-tight manner. The hoses B and C are somewhat flexible and may be conventional garden hose. The connection A consists of a male coupling 2 and a female coupling 4 which thread together to provide the fluid-tight joint. Usually, each hose B and C will have a male coupling 2 at one end and a female coupling 4 at the other end. Not only will the couplings 2 and 4 connect with each other but they will also connect with most conventional couplings. For example, the female coupling 4 will connect with a conventional male hose coupling or with a conventional fixed hydrant. Similarly, the male coupling will fit a conventional female hose coupling or a similar coupling on a nozzle, lawn sprinkler, or the like.

Figure 2:
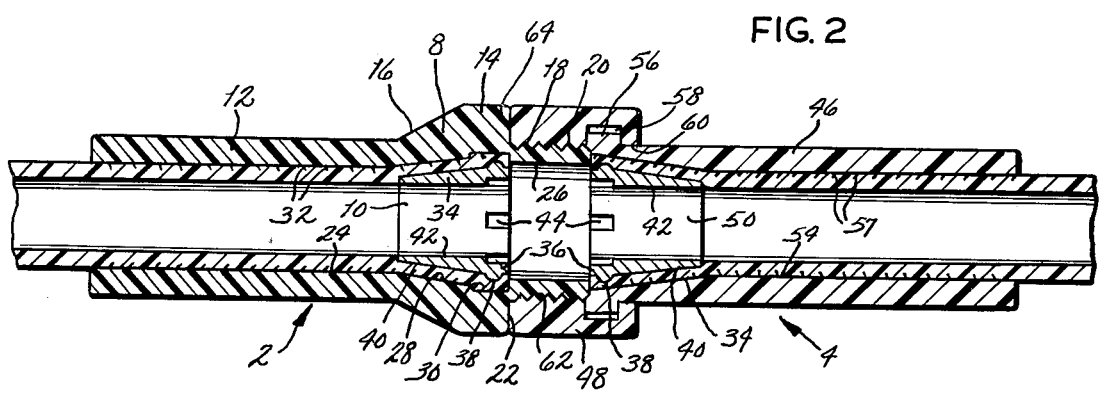
FIG. 2 is a sectional view of the connection taken along lines 2—2 of FIG. 1.
Figure 3:
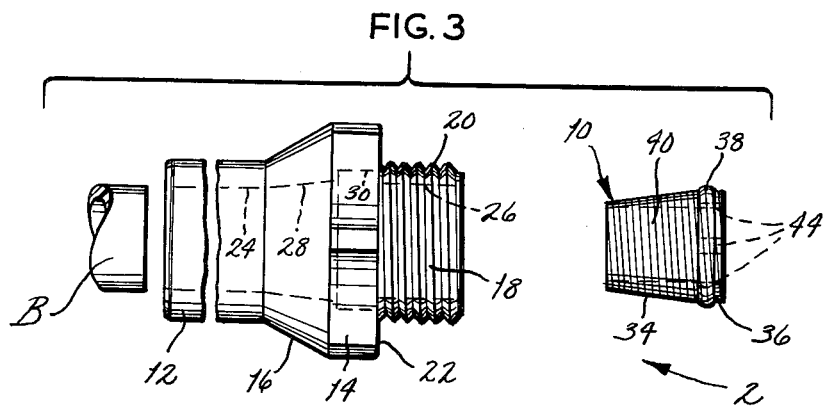
FIG. 3 is an exploded view of the male coupling forming part of the connection.

The male coupling 2 has two primary components—namely (FIGS. 2 & 3), a body 8 that fits over the end of the hose B and a bushing 10 that fits into the end of the hose B and expands that end outwardly, causing it to interlock with the body 8.

The body 8 is molded as an integral unit from a somewhat flexible plastic such as a vinyl thermal-type plastic or a low density polyurethane. It includes a ferrule 12 that merges into an enlarged intermediate section 14 at a beveled surface 16. The intermediate section 14 in turn merges into an end section 18 having external threads 20. The end section 18 is smaller in diameter than the intermediate section 14 and the two sections 14 and 18 are joined at a shoulder 22 which is perpendicular to the axis of the ferrule 12.

Extending through the ferrule 12 is a bore 24, the diameter of which is about the same as the outer diameter of the hose B, so the hose B may be inserted with relative ease into the ferrule 12. The threaded end section 18 likewise contains a bore 26 which is somewhat larger than the bore 24 and is indeed large enough to receive the bushing 10 in its entirety. The two bores 24 and 26 are separated by a tapered interior surface 28 and an annular recess 30 which opens inwardly and is larger in diameter than either of the bores 24 and 26 and the tapered surface 28 as well. Indeed, the tapered surface 28 leads away from the end of the bore 24 and terminates at the recess 30 which is adjacent to the bore 26. The bore 24, the tapered surface 28, and the inwardly presented surface of the recess 30 are all lined with short barbs 32 which project inwardly and also forwardly toward the bore 26 in the end section 18. The hose B extends forwardly through the bore 24, the tapered surface 28 and the recess 30, it being spread outwardly into firm contact with the tapered surface 28 and the wall of the recess 30 by the bushing 10 which fits into the end of the hose B within this region.

Externally the bushing 10 (FIGS. 2 & 3) has a tapered leading portion 34 and an enlarged trailing portion 36 provided with a circumferential rib 38 that is arcuate or convex in cross-section. The two portions 34 and 36 merge at the front of the rib 38 and a thread 40 spirals around both of the portions 34 and 36, including the rib 38 on the latter. Internally the bushing 10 has a bore 42 which extends from one end of the bushing 10 to the other. The bore 42 is constant in diameter, and that diameter is substantially the same as, and normally no less than, the inside diameter of the hose B. At its large diameter end the bushing 10 is further provided with notches 44 which are arranged in pairs 180° apart so that any pair may be engaged by a tool to turn the bushing 10. The bushing 10 is formed from a material that is harder than both the materials from which the hose B and body 8 are formed, and that material may be a metal such as brass or aluminum, or a plastic such as a high density polyethylene.

To install the male coupling 2 on the hose B, the end of the hose B is inserted through the bore 24 and the tapered interior surface 28 until the end of the hose B reaches the recess 30. Then the bushing 10 is inserted through the bore 26 with the tapered portion 34 leading. After a short distance the end of the tapered portion 34 comes against the end of the hose B, whereupon the bushing 10 is forced still further into the bore 26. Usually it is turned or maneuvered slightly to facilitate the entry of the small diameter end of the tapered portion 34 into the end of the hose B. Next the bushing 10 is engaged with a tool at a pair of its notches 44 and is turned. The thread 40, being relatively sharp, bites into the material of the hose B, and as a consequence the bushing 10 advances still further into the hose B, spreading the end of the hose B as it does. Indeed, the bushing 10 spreads the hose B outwardly into the barbs 32 along the tapered interior surface 28, causing those barbs 32 to embed in the outside surface of the hose B. Moreover, the circumferential rib 38 eventually enters the interior of the hose B and deforms the hose end outwardly into the annular recess 30 of the body 8. In this regard, the clearance between the rib 38 and the opposite surface of the recess 30 is relatively small, and indeed it is so small that the end of the hose B, upon being deflected, occupies the entire recess 30, that is, the entire space between the exterior surface of the bushing 10 and the opposite surface of the recess 30. Since the material from which the body 8 is formed is relatively flexible, the body 8 may flex or expand at its intermediate section 14 to accomodate the expanded hose end and the bushing 10 within that hose end. Stated differently, the clearance between the trailing portion 36 of the bushing 10 and the surface of the annular recess 30 is less than the wall thickness of the hose B, so that the hose B will expand to completely fill the recess 30 and may even slightly deform the intermediate section 14 of the body.

Figure 4:
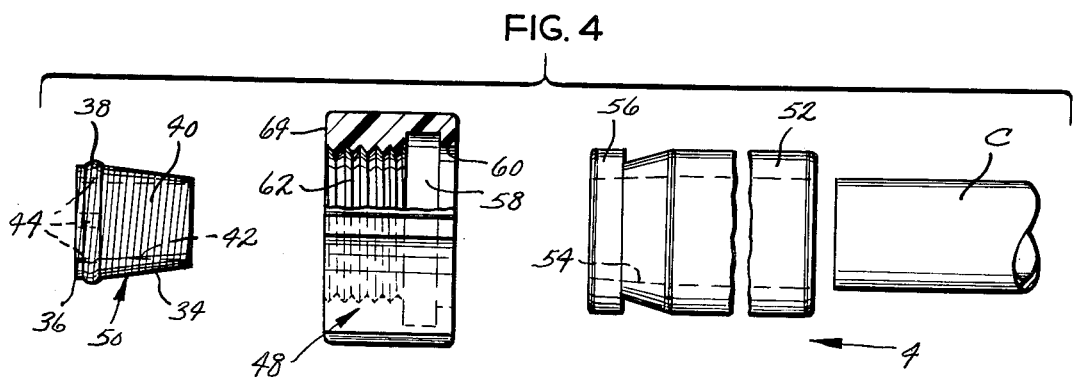
FIG. 4 is an exploded view of the female coupling forming part of the connection.

The female coupling 4 consists of three components, namely (FIGS. 2 & 4)—a body or ferrule 46 that fits over the end of the other hose C, a ring 48 that fits around the end of the ferrule 46 and threads over the threaded end section 18 for the body 8 of the male coupling 2, and a bushing 50 which fits into the end of the hose C and maintains the hose C within the ferrule 50.

Considering first the ferrule 46 (FIGS. 2 & 4), it is molded or otherwise formed from a relatively flexible material such as thermal-type vinyl or low density polyethylene. For the most part the ferrule 46 is nothing more than a simple sleeve having a generally cylindrical exterior surface 52 and a bore 54 extending completely through it. However, at one end the ferrule 46 also has a flange 56 which projects outwardly beyond the surface 52. Also, the bore 54 flares slightly outwardly in the region the flange 56 and along its entire length is provided with barbs 57. The diameter of the bore 54 is about the same as the outside diameter of the hose C, so the hose C may be inserted into it with relative ease. Actually, when the hose C is within the bore 54 and the bushing 50 is in place, the exterior surface 52 is generally cylindrical. However, when the ferrule 46 is detached, the exterior surface 52 tapers downwardly at the flange 56 and the outside of the flange 56 is only slightly larger than the opposite or remote end of the surface 52, and this, of course, is the configuration of the ferrule 50 as it is molded.

The ring 48 is formed from a somewhat harder material than the material of the body 8 and ferrule 46, and that somewhat harder material may be a medium density polyethylene plastic. Accordingly, the ring 48 is less flexible or less resilient than the body 8 and the ferrule 46. The ring 48 has (FIGS. 2 & 4) a cylindrical exterior surface that is easily gripped. It also has an annular groove 58 that opens inwardly and receives the flange 56 of the ferrule 46. Beyond the groove 58 the ring 48 has a bore 60 which is slightly larger in diameter than the diameter of the exterior surface 52 of the ferrule 42. Moreover, the bore 60 is large enough to permit the flange 56 of the ferrule 46 to pass through it, but only when the ferrule 46 is free of the bushing 50. This, of course, permits the ring 48 to be installed upon the ferrule 46. On the opposite side of the groove 58, the ring 48 has inwardly presented threads 62 which are sized to engage and mate with the external threads 20 on the end section 18 of the body 8 for the male coupling 2. The ring 48 terminates at an abutment surface 64 that is squared off with respect to the axis of the ring 48.

The spacing between the annular groove 58 and the abutment surface 64 is such that when the ring 48 is turned down tightly over the external threads 20 of the coupling 2 (FIG. 2), the abutment surface 64 will come snugly against the shoulder 22 on the body 8 of the coupling 2, whereas the back wall of the groove 58 will bear tightly against the flange 56 on the ferrule 46 and urge the forward end of the ferrule 46 snugly against the forward end of the threaded end section 18 on the body 8 of the coupling 2. Since both the body 8 and the ferrule 46 are formed from a relatively flexible material, the ferrule 46 and end section 18 each conform to any irregularities in the other, thereby creating good seal between the two couplings 2 and 4. The same occurs along the shoulder 22 of the coupling 2 where the abutment surface 64 of the ring 48 abuts that shoulder, and also along the groove 58 where the back wall of the groove 58 abuts against the back wall of the flange 56 on the ferrule 46.

The bushing 50 is identical to the bushing 10 and as such includes (FIGS. 2 & 4) a tapered leading portion 34, an enlarged trailing portion 36, a circumferential rib 38, a thread 40, a bore 42, and notches 44. When the bushing 50 is properly installed, its large diameter end is flush with the end of the hose C, and both are set slightly rearwardly from that end of the ferrule 46 which abuts against the threaded end section 18 on the coupling 2. The bushing 50, of course, spreads the end of the hose C outwardly, causing the barbs 57 to embed within the outer surface of the hose C. The hose C in turn spreads the flanged end of the ferrule 46 outwardly and rigidifies the flange 56. Indeed, the diameter of the leading end of the bore 54 within the ferrule 46 is such that the bushing 50 will spread the ferrule 46 to the extend that its exterior surface 52 assumes a cylindrical configuration and its flange 56 is rigidified and retained securely within the groove 58 of the ring 48. The circumferential rib 38 on the bushing 50 enhances the retention of the hose C by the ferrule 46.

To assemble the female coupling 4 around the end of the hose C, the flange 56 of the ferrule 46 is first inserted through the bore 60 in the ring 48, and the flange 56 is allowed to expand outwardly into the groove 58 of the ring 48. Then the end of the hose C is forced through the bore 54 of the ferrule 46. Once the hose C is properly positioned within the bore 54, the small diameter end of the bushing 50 is forced into the exposed end of the hose C. This spreads the hose C slightly at its end and enables the thread 40 of the bushing 50 to bite into the softer material of hose C. Then the bushing 50 is turned with a tool such that it threads into the hose C and spreads the hose end as well as the surrounding flanged end of the ferrule 46.

Thus the female coupling 4 is installed with considerable ease on the hose C. Indeed, the installation may be performed by individuals without any significant skills and without highly specialized tools. The same holds true with regard to the installation of the male coupling 2 on the hose B.

The coupling 4 is easily connected with the coupling 2 merely by engaging the internal threads 62 of the ring 48 with the external threads 20 on the body 8 of the coupling 2, and then turning the ring 48 so that it threads down over the end section 18 of the body 8. Indeed, the ring 48 is turned until its abutment surface 64 contacts the shoulder 22 on the body 8, forming a fluid tight seal which is particularly secure because of the somewhat pliant or resilient characteristics of the material from which the body 8 is formed. When the ring 48 is tightened to its fullest extent, it also forces the end of the ferrule 46 tightly against the end of the end section 18 on the body, forming another fluid-tight seal in the region. Again the seal is extremely secure because of the resilient characteristics of the materials from which the body 8 and ferrule 46 are molded. The same holds true along the flange 56 and the back wall of the groove 58 in the ring 48. Thus, a considerable amount of sealing redundancy is provided in the connection A, and this renders the connection A virtually leakproof.

Moreover, the connection A does not require any separate washers to effect a leakproof joint, for the resiliency of the body 8 on the male coupling 2 and the ferrule 46 on the female coupling 4 is sufficient to accomodate and close any irregularities in abutting surfaces. Hence, the troubles with loosing and replacing the typical hose washers are completely eliminated.

The male coupling 2 will fit into a conventional female coupling and likewise form a good seal with it. Similarly, the female coupling 4 will fit a conventional male coupling, such as a hydrant, and form a good seal with it.

Since the bores 42 and 60 which extend through the bushings 10 and 50, respectively, are no smaller in diameter than the insides of the hoses B and C, the bushings 10 and 50, as well as the couplings 2 and 4 of which they are a part, present little, if any, obstruction to the flow of water through the hoses B and C. Also, the bushing 10 flares the hose B outwardly into the body 8 of the male coupling 2, and thereby secures the coupling 2 firmly on the hose B. The barbs 32 further cooperate to retain the hose B in place. As a consequence the coupling 2 remains firmly on the end of the hose B, even after extended periods of use at high pressures. Likewise, the bushing 50 spreads the end of the hose C outwardly into the ferrule 46 of the coupling 2 and actually expands the ferrule 46. This coupled with barbs 57 secures the coupling 4 firmly on the hose C.

The ferrules 12 and 46 of the couplings 2 and 4, respectively, are somewhat flexible, and accordingly will bend slightly with their respective hoses B and C. As a result, the tendency for the hoses B and C to acquire kinks immediately beyond their couplings 2 and 4 is substantially reduced. This feature is particularly beneficial when the female coupling 4 is connected to a fixed male fitting such as a hydrant.

Since the body 8 of the male coupling 2 and the ferrule 46 of the female coupling 4 are quite flexible, they can expand within limits to accomodate hoses of varying diameters, both inside and outside.

Not only is the connection useful in joining the ends of different hoses, but it is also highly suitable for mending a defective hose between its couplings.

While the couplings 2 and 4 are ideally suited for use on the ends of hoses, they may also be installed on the ends of other types of conduits such as plastic pipes. Indeed, the connection A is very useful in joining electrical conduits end to end, because of the simplicity with which its couplings 2 and 4 are connected to the conduits as well as to one another. Since the bores 42 of the bushing 10 and 50 are quite large, they will not interfere with efforts to pass wire through them and the conduits that are joined at the couplings 2 and 4.

This invention is intended to cover all changes and modifications of the example of the invention herein chosen for purposes of the disclosure which do not constitute departures from the spirit and scope of the invention.

What is claimed is:

1. In combination with first and second conduits, such as hoses, a connection for joining the conduits at their ends, said connection comprising: a first flexible body fitted over the first conduit, the first flexible body being formed from a plastics and having at one end a threaded section provided with external threads; a first bushing fitted into the end of the first conduit such that the first conduit is spread outwardly and bears against the first flexible body, forming a fluid-tight seal therewith, the first bushing being made from a material that is substantially harder and less flexible than the material from which the first flexible body is formed; a second flexible body fitted over the second conduit and also being formed from a plastics; a second bushing fitted into the end of the second conduit such that the second conduit is spread outwardly and bears against the second flexible body, forming a fluid-tight seal therewith, the second bushing being made from a material that is substantially harder and less flexible than the material from which the second flexible body is formed; and a ring engaged with the second flexible body such that it can rotate on the second flexible body but is confined axially on that body, the ring having internal threads for engaging the external threads on the threaded section of the first flexible body and drawing the two flexible bodies into abutting engagement with one another and fluid-tight contact.

2. The combination according to claim 1 wherein the inside diameter of the first bushing is generally no less than the inside diameter of the first conduit beyond the connection and the inside diameter of the second bushing is generally no less than the inside diameter of the second conduit beyond the connection.

3. The combination according to claim 1 wherein the second flexible body has a flange that projects outwardly and the ring has a groove that receives the flange; and wherein the flange will fit into and can be withdrawn from the ring when the second bushing and second conduit are detached from the second flexible body.

4. The combination according to claim 1 wherein the first flexible body has a shoulder located at the end of the threaded section and the ring on the second flexible body has at its end an abutment face which abuts against the shoulder on the first flexible body when the ring draws the two bodies together such that the threaded end section on the first flexible body is against the end of the second flexible body.

5. The combination of claim 1 wherein the first flexible body also has an intermediate section which is located between its ferrule and the threaded end portion; and wherein the first bushing expands the first hose into the intermediate section.

6. The combination according to claim 1 wherein the bushings externally have a tapered leading portion and an enlarged trailing portion; wherein a thread spirals around the two portions; and wherein the enlarged portion is further provided with a circumferential rib which projects outwardly therefrom.

7. A female coupling for a hose or similar conduit, said coupling comprising: a ring having internal threads and an inwardly opening groove; a ferrule fitted at one end into the ring and being sized internally to receive the hose, the ferrule being formed from a material that is somewhat flexible so that the ferrule can be distorted, the ferrule at said one end having a flange which normally projects into the groove of the ring to retain the ring on the ferrule, the flange being flexible enough and small enough to be inserted into the ring and engaged with the groove of the ring when the ferrule is not rigidified from within; and a tapered bushing sized to fit into the end of the hose and having an external thread to enable the bushing to be threaded into the hose when the hose is within the ferrule, so that the hose is expanded against the ferrule, the bushing being sufficiently rigid to further, upon being threaded into the hose, expand and rigidify the resilient ferrule at its flange, with the expansion being great enough to project the flange into the groove of the ring and prevent the ring from being removed from the ferrule.

8. A coupling according to claim 7 in combination with a hose that fits into the ferrule; and wherein the inside diameter of the bushing is generally no less than the inside diameter of the hose beyond the coupling.

9. A coupling according to claim 7 wherein the bushing externally has a leading tapered section and a trailing enlarged section, both of which have the thread spiralled around them; and wherein the enlarged section is provided with a circumferential rib that projects radially outwardly and is convex in cross-section.

10. A male coupling for a hose or similar conduit, said coupling comprising: a body formed from a somewhat flexible material and having a ferrule at one end, an end section at the other end, and an intermediate section between the ferrule and the end section, the ferrule having a bore adapted to receive a hose, the intermediate section being larger in terms of radius than the ferrule or the end section, the intermediate section further containing a tapered surface and an annular recess with the tapered surface flaring outwardly from the bore and terminating at the recess which opens inwardly and is larger in diameter than the large end of the tapered surface, the end section having external threads and a bore that extends from the recess to the end of the body but is smaller in diameter than the recess; and a tapered bushing sized to fit through the bore in the end section and into the end of the hose and having an external thread to enable the bushing to be threaded into the hose, the bushing being sufficiently rigid to expand the hose outwardly into snug contact with the tapered surface of the body and also having a rib that locates opposite the recess when the bushing is fully inserted into the hose with the rib being large enough to expand the hose into the recess.

11. A coupling according to claim 10 wherein the intermediate section of the body has a shoulder and the threaded end portion projects from the shoulder.

* * * * *